(No Model.)

M. HARVEY.
Universal Joint Coupling.

No. 239,952. Patented April 12, 1881.

Witnesses.
Israel Sovereign
A. O. Behel

Inventor.
Matthew Harvey
Per Jacob Behel
Atty.

UNITED STATES PATENT OFFICE.

MATTHEW HARVEY, OF ROCKFORD, ILLINOIS.

UNIVERSAL-JOINT COUPLING.

SPECIFICATION forming part of Letters Patent No. 239,952, dated April 12, 1881.

Application filed March 1, 1881. (No model.)

*To all whom it may concern:*

Be it known that I, MATTHEW HARVEY, a citizen of the United States, residing in the city of Rockford, in the county of Winnebago and State of Illinois, have invented a new and useful Universal-Joint Coupling, of which the following is a specification.

My invention relates to that class of universal-joint couplings known as "safety-couplings," employed to connect tumbling rods or shafting for various purposes; and its construction and application will be hereinafter more fully explained.

Figure 1:
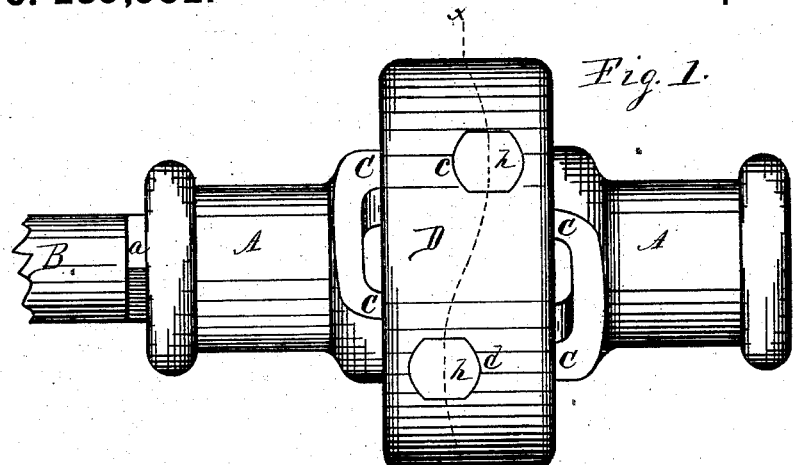
Figure 2:
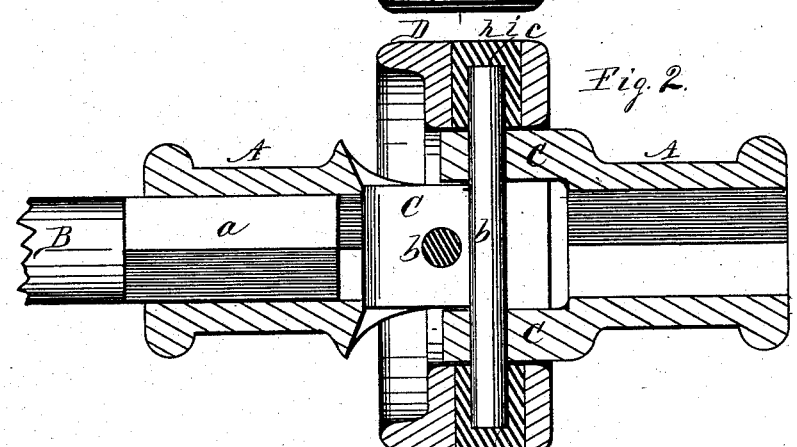
Figure 3:
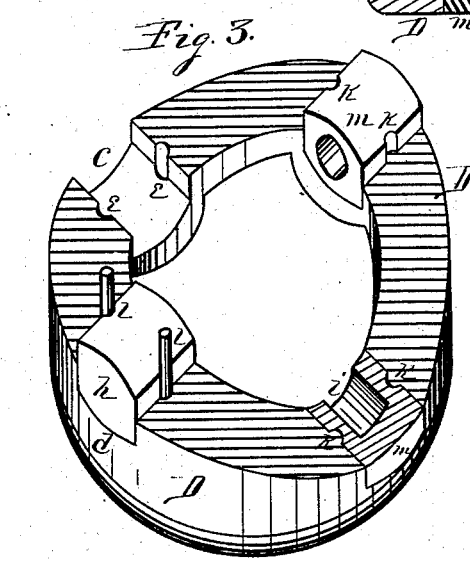
Figure 4:
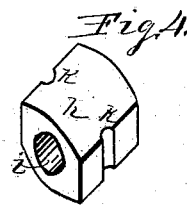

In the accompanying drawings, Figure 1 is a side view of my improved coupling, of which Fig. 2 is a lengthwise central section. Fig. 3 is an isometrical transverse sectional view of the coupling-ring cut on the waved dotted line $x$ through the bearing centers of the connecting bolts or rods. Fig. 4 is an isometrical representation of one of the chilled bearings.

In the figures, A represents the coupling-heads of the shaft, in this instance fitted with axial openings, rectangular in cross-section, adapted to receive the square end portions $a$ of the shafting B. These coupling-heads are provided with coupling-arms C, projecting in their lengthwise direction from opposite sides of their end portions, with transverse holes to receive the coupling-pins $b$, all of which is substantially the same as like parts now in general use in universal couplings.

At D is represented the coupling-ring, circular in plan, having a smooth outer surface. This ring at quarter-spaces is provided with radial openings, as at $c$ and $d$, adapted to receive suitable bearings designed to receive the end portions of the coupling-pins. These openings at one or both sides are provided with holes $e$, passing through the ring parallel with its axial center in such a manner that the center of the hole will be about on the line of the end wall of the opening in the ring, as represented at $e$ in the opening $c$.

At $h$ is represented the removable bearings, made from any suitable material, as of chilled iron or cast-steel, but preferably of what is known as "hard or white iron," and are produced of proper size and form to enter the openings $c$ and $d$ in the ring, and are provided with a central axial opening, $i$, extending from their inner end outward, producing a tubular opening, with closed outer end, of proper form and dimensions to receive the end portions of coupling-pins. These bearings are formed with semicircular recess $k$, of the proper size, and in position to coincide with the semicircular portion of the holes $e$, producing a circular hole, when the bearing is in position in its seat in the ring, to receive a pin or pins, as at $l$, to fix the bearings in the ring in a removable manner.

The coupling-ring D, at points on radial lines opposite the removable bearings of the openings $c$ and $d$, are provided with bearings $m$, in every particular the same as the removable bearings $h$; but in this instance these bearings $m$ are fixed, having been placed in position in the mold of the ring, and the molten metal to form the ring poured into the mold, forming the ring inclosing the bearings. The coupling-ring is of such width as to permit the bearings, in pairs, to be placed toward the opposite edges thereof to such an extent as to permit the coupling-pins placed in the bearings to cross each other in the center of the ring. The coupling-pins, as at $d$, are cut to proper length from suitable bars of iron or steel.

In putting my improved coupling together the coupling-head is placed in the ring in position. A coupling-pin is then passed through the opening $c$ or $d$, depending upon the position of the head relatively with the bearings, and through the arms of the coupling-head into the fixed bearing on the opposite side of the ring. The removable bearing is then put in place in the opening in the ring in such a manner as to receive the end portion of the coupling-pin in its axial opening, and when in place in the ring a pin or pins of proper dimensions is driven into the holes $e$, which fixes the bearing in position and connects the coupling-head with the ring in a properly-hinged manner. This same operation is repeated in placing the second head in position in the ring, which, when accomplished, presents the coupling complete, ready for the trade or for use.

In the foregoing I have shown and described but two of the tubular bearings as being removable and the opposite bearings to these as fixed in the ring, which arrangement I prefer; but it will readily be seen that instead of the fixed bearings removable bearings may be substituted, in which arrangement or construction the several parts may be renewed as occasion may require.

By this construction I produce a safety-coupling having a smooth exterior free from projecting parts, liable to engage anything with which they come in contact, and a coupling provided with durable bearings, and in which any of the parts may be changed when worn or broken.

I claim as my invention—

1. A coupling-ring in one piece having a smooth exterior and provided with removable bearings, substantially as and for the purpose hereinbefore set forth.

2. The combination, with a coupling-ring, of removable chilled or hard-metal bearings, substantially as and for the purpose hereinbefore set forth.

3. The combination, with the removable bearings, of removable coupling-pins, substantially as and for the purpose hereinbefore set forth.

4. The combination, with the coupling-ring, substantially as herein described, of coupling-heads connected therewith by means of removable coupling-pins having removable bearings, substantially as and for the purpose hereinbefore set forth.

MATTHEW HARVEY.

Witnesses:
J. D. RALSTON,
A. O. BEHEL.